United States Patent
Blake et al.

(10) Patent No.: US 6,304,680 B1
(45) Date of Patent: Oct. 16, 2001

(54) HIGH RESOLUTION, HIGH ACCURACY PROCESS MONITORING SYSTEM

(75) Inventors: Scott W. Blake, Westford, MA (US); Frederick S. Fenning, deceased, late of Medford, MA (US); Lucille M. Kayes, administratrix, Bothell, WA (US); Ilya Lapshin, Brookline, MA (US)

(73) Assignee: Assembly Guidance Systems, Inc., Chelmsford, MA (US)

( * ) Notice: Subject to any disclaimer, the term of this patent is extended or adjusted under 35 U.S.C. 154(b) by 0 days.

(21) Appl. No.: 09/176,864

(22) Filed: Oct. 22, 1998

Related U.S. Application Data (60) Provisional application No. 60/063,067, filed on Oct. 27, 1997.

(51) Int. Cl.[7] .................................................. G06K 9/36
(52) U.S. Cl. ........................ 382/285; 382/141; 382/154; 345/438
(58) Field of Search .................... 382/154, 285, 382/287, 289, 291, 293, 294, 296, 298, 276, 299, 151, 141, 277; 345/420, 425, 437, 438; 348/94–95, 125, 135, 189, 190; 250/250.1

(56) References Cited

U.S. PATENT DOCUMENTS

| | | | |
|---|---|---|---|
| 4,700,225 | 10/1987 | Hara et al. ............................. | 358/106 |
| 4,845,558 | 7/1989 | Tsai et al. ............................. | 358/106 |
| 4,989,082 | 1/1991 | Hopkins ................................ | 358/101 |
| 5,091,963 | 2/1992 | Litt et al. ................................ | 382/8 |
| 5,129,009 | 7/1992 | Lebeau .................................... | 382/8 |
| 5,157,735 | 10/1992 | Maeda et al. ............................ | 382/8 |
| 5,384,523 | 1/1995 | Masuda ............................ | 318/568.19 |
| 5,388,059 | * 2/1995 | DeMenthon .......................... | 364/559 |
| 5,452,369 | 9/1995 | Lionti et al. .......................... | 382/141 |
| 5,455,870 | 10/1995 | Sepai et al. ............................ | 382/147 |
| 5,471,541 | * 11/1995 | Burtnyk et al. ...................... | 382/153 |
| 5,506,914 | 4/1996 | Baker ................................... | 382/141 |
| 5,510,833 | 4/1996 | Webb et al. .......................... | 348/190 |
| 5,559,334 | * 9/1996 | Gupta et al. ....................... | 250/360.1 |
| 5,566,292 | 10/1996 | Krembs ................................ | 395/142 |
| 5,633,995 | * 5/1997 | McClain ............................... | 395/119 |
| 5,828,770 | * 10/1998 | Leis et al. ............................ | 382/103 |
| 5,884,239 | * 3/1999 | Romanik, Jr. ....................... | 702/150 |
| 5,988,862 | * 11/1999 | Kacyra et al. ...................... | 364/528 |
| 5,999,187 | * 12/1999 | Dehmlow et al. ................... | 345/420 |

\* cited by examiner

*Primary Examiner*—Leo Boudreau
*Assistant Examiner*—Kanji Patel
(74) *Attorney, Agent, or Firm*—Perkins, Smith & Cohen, LLP; Jacob N. Erlich; Jerry Cohen

(57) ABSTRACT

A method and system for monitoring a process which determines a location of a product in three dimensional space with respect to a process monitoring system. This is accomplished by generating a rotation and translation transform which enables the process monitoring system to define the location of the product placed in a field of view of the process monitoring system, applying the transform to three dimensional CAD data defining the process being performed with respect to the product to provide transformed CAD data representative of three dimensional information in a two dimensional pattern of the process with respect to the process monitoring system. Utilizing the above, a determination is made whether the two dimensional pattern of the process is present within a range of acceptable images of the process performed with respect to the product. If the product is processed properly the two dimensional pattern of the process is present within the range of acceptable images.

18 Claims, 9 Drawing Sheets

HIGH RESOLUTION, HIGH ACCURACY PROCESS MONITORING SYSTEM

CROSS REFERENCE TO RELATED APPLICATIONS

This application claims priority of U.S. Provisional Application Ser. No. 60/063,067 filed Oct. 27, 1997 entitled HIGH RESOLUTION, PRECISION MONITORING SYSTEM by Scott W. Blake et al.

STATEMENT OF GOVERNMENT INTEREST

This invention was made with Government Support under contract number F33615-96-C-5627 awarded by the United States Air Force, Wright Laboratory WL/MLKT. The Government has certain rights in the invention.

BACKGROUND OF THE INVENTION

This invention relates generally to process monitoring systems, and, more particularly to a high resolution, high accuracy monitoring system capable of 3D process monitoring with 2D video and a precise angular aiming system.

Manufacturing errors are expensive. An error in manufacturing results in costs relating to raw materials, machine time, resolution time, and rework or scrap disposal.

The cost of a manufacturing error is lowest when the error is detected and corrected at the earliest possible time in the process. Each process which occurs after a manufacturing error has occurred adds costs to the product. The flawed product will eventually cause a manufacturing disruption or become scrap. A dimensioning error which is not detected when the dimension is created can allow the repeated production of parts which will not function properly.

It has been said that quality cannot be "inspected into" parts. Quality is the result of each and every process occurring correctly. By monitoring dimensional quality "in process" (as the process is occurring) problems can be detected and resolved at the earliest possible time and at the lowest possible cost. The detection of developing problems, during process deterioration but before unacceptable processing occurs, lowers costs and improves the efficiency of a manufacturing system. Costs are reduced by resolving the problem before scrap is created or downstream disruptions occur.

A single fixed camera has a resolution which generally does not exceed 640 by 480 pixels. Single camera inspection has been limited to 2D inspection of small areas (tens of square feet). Large inspection fields are supported by mounting the camera on a gantry. The gantry is generally 2D, and the cost and complexity associated with precision over large areas rapidly becomes prohibitive.

Another method of expanding the field size of a single camera is to aim the camera through a pair of XY galvanometric mirrors. While this increases the field size for the single camera, accuracy and precise focus are limited. Inspection cameras aimed through mirrors are limited to 2D applications.

Another drawback of single camera systems (stand alone, on gantries or aimed with mirrors) is the complexity and unreliability of the video processing task for the data read in from the camera.

It is therefore an object of this invention to provide 3D process monitoring with a 2D video system.

It is a further object of this invention to position a camera's viewing field in small regions of interest which may be occur anywhere over a large area.

It is still a further object of this invention to control inspection parameters in processing the data captured by a video camera.

It is another object of this invention to generate 2D views of 3D characteristics for the purpose of limiting regions of interest in a video camera inspection system.

SUMMARY OF THE INVENTION

The objects set forth above as well as further and other objects and advantages of the present invention are achieved by the embodiments of the invention described hereinbelow.

The present invention uses transforms to generate 2D views of 3D characteristics as defined in 3D CAD data. The invention (high resolution, high accuracy 3D process monitoring with a 2D video camera and a precise angular aiming system) allows automated inspection to occur faster, more reliably, more accurately, and over larger areas and volumes (3D space) than existing inspection systems.

3D dimensional inspection requires two cameras and typically has limited field size (tens of square feet except in large, expensive systems). The invention expands this field size and volume by an order of magnitude (to hundreds of square feet with comparable accuracy) without requiring the complexity of multiple cameras and equipment to move the cameras.

CAD data is used to define most assembly and dimensional manufacturing processes, both manual and automated. The ability to use the CAD definition of a 2D or 3D dimensional process for automatic in-process quality monitoring can yield cost reductions related to the frequency and impact of errors occurring in the manufacturing process. The invention allows automatic documentation and verification in answer to the question: "are things where they are supposed to be?"

Inspection solutions in use today search for edges and calculate where things have been found. Such systems often find edges which are unrelated to the current inspection task. The invention first calculates exactly what it is looking for and where it should be. The invention then looks only precisely where a process characteristic should be and determines whether or not the characteristic is present. This simplifies detection tasks and reduces vision system errors. Detection of spurious or contradicting characteristics is eliminated because the vision system operates only in the precise region of interest of the tolerance band.

Mapping of 3D definition onto the single 2D camera allows the vision system to recognize geometries which would be potentially confusing to a 2D system.

The system of the present invention maintains a 3D model which is accurately referenced to the part being inspected. This 3D model mapped onto the 2D camera field enhances accurate process characteristic recognition.

The savings resulting from the application of the invention fall into several categories:

The invention provides a less expensive inspection system than current products with higher performance inspection capabilities. The higher performance characteristics include: larger field, higher resolution and accuracy, and more reliable characteristic detection.

Manufacturing costs are reduced through the application of the invention. Costs relating to scrap, rework, and process stoppage are reduced through the earliest possible detection and resolution of process errors.

The invention can provide inexpensive, traceable documentation of accurate processing for each part produced.

This electronic documentation is automatically generated and made available for storage. Analysis of this data for Statistical Process Control (SPC) can yield improvements in production efficiency.

The process documentation automatically generated for each inspection can take the form of dimensional information or pictures. This data is generated by a computer and can be stored on inexpensive computer media such as disk or tape. This documentation has value in proving to customers that each part is known to be correct through a non-subjective, traceable to a standard, measurement system. This is a performance advantage which has economic value in competitive production situations. Traceable documentation is becoming a standard with the advent of ISO 9000 procedures.

The invention also has value in its ability to improve the performance of vision software which is used to decipher characteristics from frames of video. Data created by the invention is used to improve detectability of inspection characteristics. This data also reduces the amount of processing required to complete an inspection task.

The invention saves time and effort by providing an automated process which can operate where inspection is not currently occurring or to replace many inspection processes which are currently manual and subjective. Manual inspection requires the presence of an inspector when a process has been completed. Inspectors cannot be everywhere at once. Waiting for a human inspector to arrive and complete the inspection task is a significant overhead cost.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

In order to better understand the present invention, an important distinction must be made between inspection and measurement. Inspection can be accomplished without absolute measurement. An inspector can use a "gauge" which does not report numbers but yields a "within/not-within tolerance" result. Precise 3D measurement must be used in creation of the gauge, but once the gauge is created, precision pass-fail inspection can occur without dimensional reporting. The present invention described below performs inspection in a "gauge-like" fashion. 3D pass/fail results are reported without 3D measurements being accomplished in the inspection process.

More specifically, the process monitoring system 5 of this invention performs inspection by capturing frames of video and mapping the proper features onto the video field. Accurate mapping requires precise dimensional information. However, the use of precise dimensional information does not imply that 3D measurements are occurring.

The process monitoring system 5 of this invention can be considered to be a generator of "gauged (2D) pictures" of 3D products. The gauges, groups of pixels accurately mapped onto the camera's field, provide pass-fail evaluations without performing actual 3D measurements. The process monitor asks the question, "is something here?" of a calibrated group of pixels on a camera's field. This is quite different from asking, "what (dimensionally) is here?"

Figure 1:
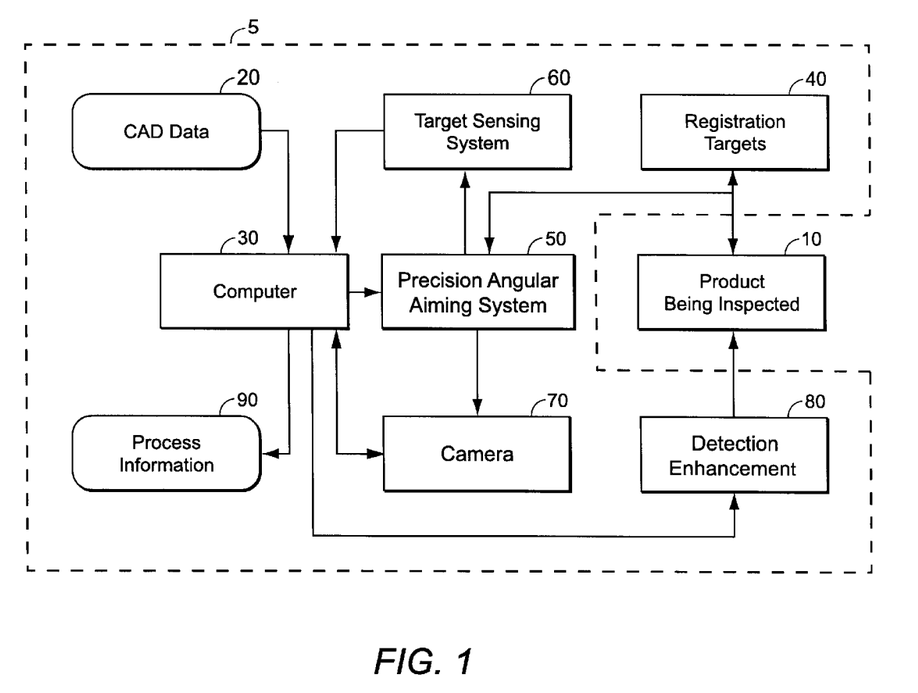
FIG. 1 is a flow chart, block diagram of the process monitoring system of this invention.
Figure 2:
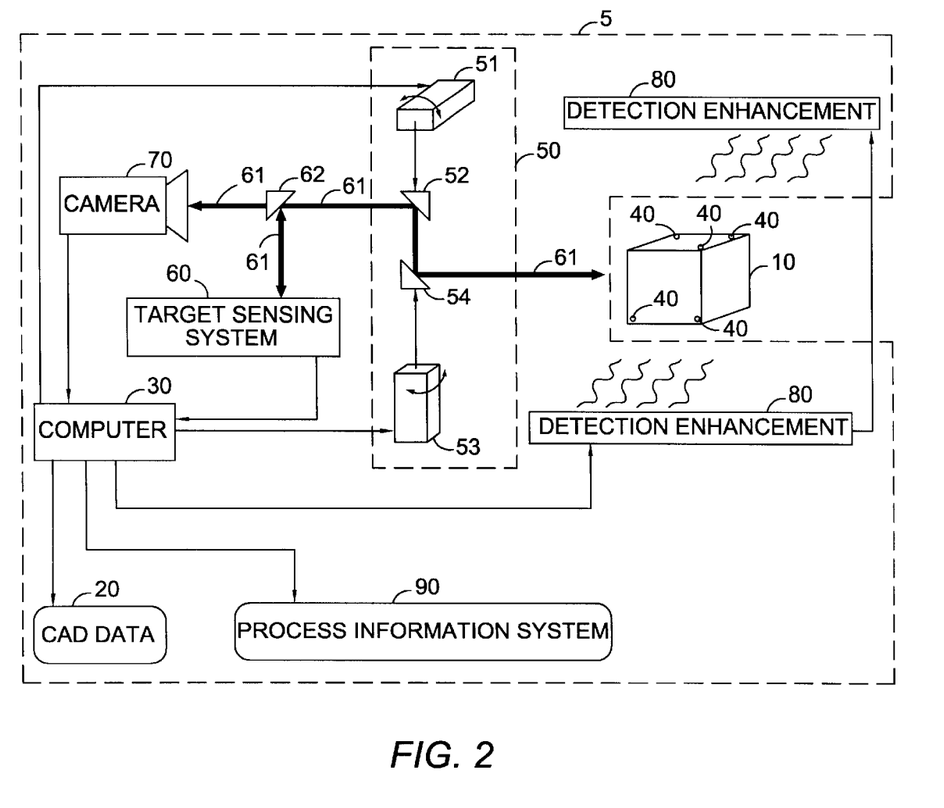
FIG. 2 is a schematic, block diagram of the process monitoring system of this invention.
Figure 3:
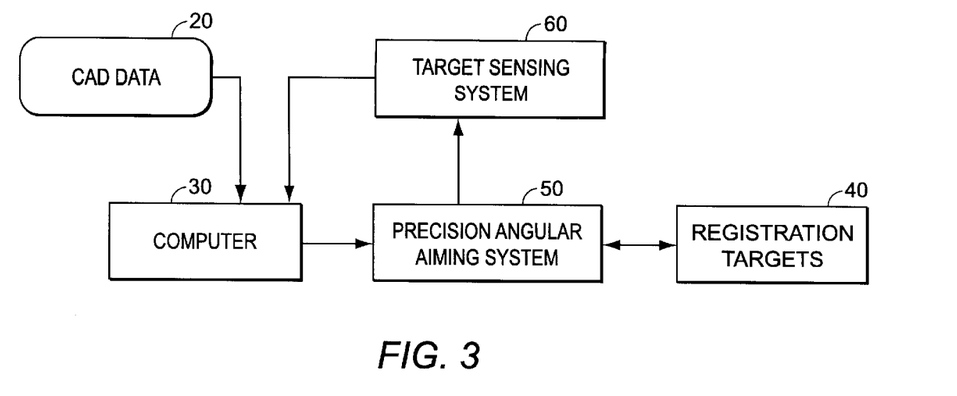
FIG. 3 is a block diagram of the components in the process monitor system of this invention used to locate a product.

The process monitoring system 5 of the present invention utilizes the following components and information sources illustrated in flow chart fashion in FIG. 1 and schematically in FIG. 2 of the drawings, wherein the numerals provided below are referenced within the drawings by block or schematic diagrams. More specifically these components are described as follows:

Product (also denoted herein as block A): a product which is being processed or inspected by the process monitoring system 5 of the present invention as defined by CAD Data 20.

CAD Data: defines the processes occurring on the product 10 which are monitored by system 5.

Computer: stores and processes data and sends and receives signal and data from all of the system components. This computer is a convention type (486/586) or any type which can support A/D and D/A converters, video transfer, video processing and communications. A keyboard and screen are not required.

Registration or reference targets: defined in the coordinate system of the product 10 and are easily found and measured by the target sensing system 60. These targets 40 can be existing recognizable characteristics on the product 10 or recognizable devices which are placed on the product 10 in known locations. Targets which are recognized with a laser based target sensing system 60 are typically dots of retroreflective material.

Precision angular aiming system: a system which optically aims the target sensing system 60 and camera 70 at the points to be inspected on the product 10 and the reference targets 40. As shown in FIG. 2, aiming is accomplished with the aiming system 50 by electronically setting pairs of angles for the orthogonally oriented scanner mirrors 52 and 54. These mirrors are attached to galvanometric scanners 51 and 53 which move to precise angles as commanded by the computer 30. Any point or region on the product 10 which can be seen from the precision angular aiming system 50 can be precisely aimed at with mirrors 52 and 54 through a precisely defined pair of angles established on the scanners 51 and 53. A conventional partially reflective optic element 62 permits camera 70 and target sensing system 60 to share a view through the precision angular aiming system 50.

Target sensing system: a system which can detect the presence of a reference target 40 when aimed at or near the target 40 by the precision angular aiming system 50 and conveys information to computer 30. The angles of the precision angular aiming system 50 combined with detection of the reference targets 40 by target sensing system 60 allow the computer 30 to determine precise pairs of angles between the process monitoring system 5 and the product 10.

Camera: a video camera which can convert optical images to electronic signals which can be processed by computer 30.

Detection enhancement: any system which, under the control of computer 30, can alter the optical characteristics of the environment where the product 10 is being monitored. An example of such a system would be directional lighting turned on and off to enhance shadows or the intense scattering of light along process characteristics or edges being viewed by the camera 70.

Process information: Pass/Fail or dimensional information relating the "as found" characteristics to the CAD definition of the product characteristics.

The purpose of the process monitoring system 5 of the present invention is primarily to monitor the processing of a product while the process is occurring. However, it should be understand that this invention also has applicability to a wide range of processing operations. The major steps in monitoring the processing of a product are summarized below with reference to FIGS. 2, 3, 4A, 4B, 5, 6, 7 and 8 of the drawings:

A. Locating product 10 relative to the process monitor system 5.

B. Calculating a range of acceptable images 101, i.e. tolerance band, (see FIG. 7) for the completion of the process on product 10.

Figure 8:
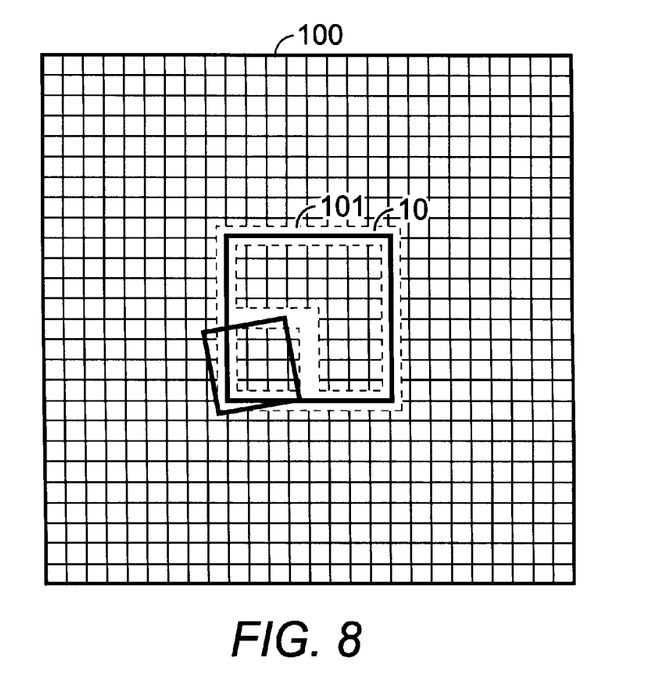
Figure 9A:
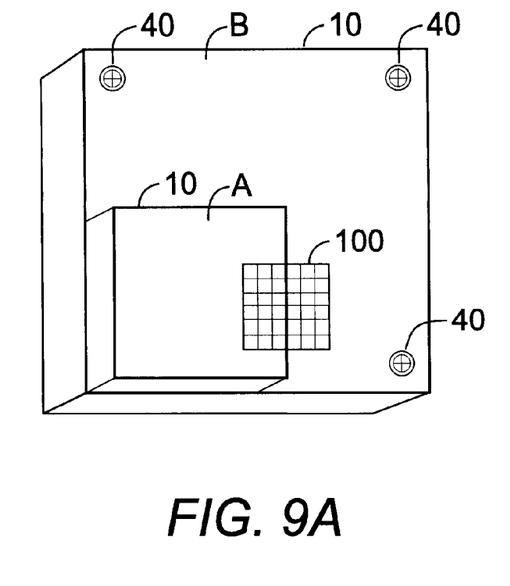
FIGS. 9A and 10 represent the tolerance band and FIG. 9B represents an enlarged view of an edge (process characteristic) of FIG. 9A utilizing the camera of the process monitoring system of this invention.
Figure 9B:
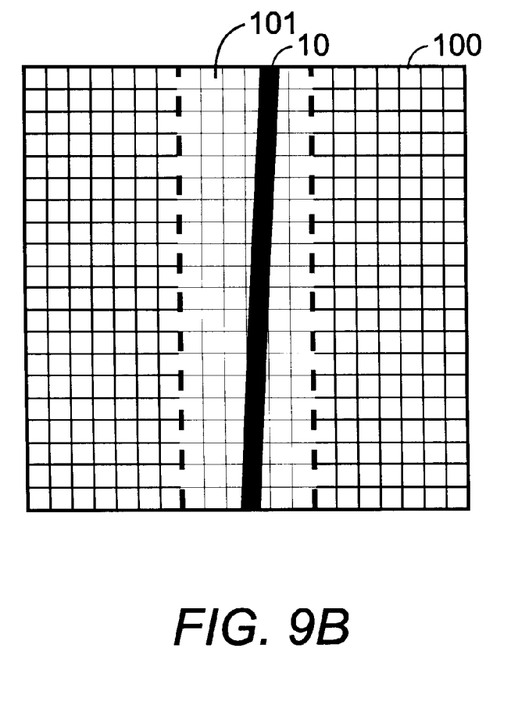

C. Capturing an image 100 (see FIG. 8) of the location on the product where the process has occurred with the camera 70 aimed through the mirrors 52 and 54 of the precision angular aiming system 50. FIG. 8 depicts a captured image 100 showing the edges of a misaligned block falling outside the tolerance band 101 (range of acceptable images) which has been mapped onto the pixels of camera 70.

D. Via the computer 30 determining whether the process characteristic is present within the range of acceptable images calculated in step B and quantify and report the results in the form of process results or information 90.

More specifically, in order to better understand the major steps of the invention set forth above, an operative example describing the operation of the process monitor system 5 of this invention using a simple example of a process which will be monitored is provided below. The same principles apply to any process being monitored.

For example, the process which will be performed and verified by the process monitoring system 5 of this invention involves the placement of a 1" cube A on the top front corner of a 2" cube B. This example is for illustrative purposes only and is not to be construed as a limitation on the invention.

Referring to FIGS. 2, 3, 4A and 4B of the drawing, the first step of locating the product 10 relative to the process monitor system 5 is accomplished by determining angles from the scanner mirrors 52 and 54 to the registration targets 40 located on product 10. These angles from registration targets 40 are defined with three dimensional coordinates in the same coordinate system as the product 10. The combination of known points or registration targets 40 defined in three dimensions and pairs of angles from the precision angular aiming system 50 enables the calculation of a rotation and translation transform (a conventional mathematical definition of the relationship between product 10 and process monitoring system 5).

Next the computer 30 signals the precision angular aiming system 50 to aim the target sensing system 60 at each registration target 40 by setting appropriate angles on the X and Y scanners 51 and 53 which steer mirrors 52 and 54 so that the target sensing system 60 can detect when the precision angular aiming system is pointing directly at each target.

As stated above, the target sensing system 60 can take any form which can detect when the precision angular aiming system 50 is pointed at registration targets 40 or other detectable references. The target sensing system 60 may utilize detectable retroreflected optical energy such as a laser beam 61. The laser beam 61 travels from the optic 62 and through mirrors 52 and 54 of precision angular aiming system 50 to registration targets 40 which may be retroreflective material. The retroreflective material can reflect the laser light back along its path through the precision angular aiming system's mirrors 52 and 54 and through optic 62 for detection by means of a conventional photocell (photodetector) and commonly used electronic circuitry to communicate detection of targets 40 to the computer 30.

The camera 70 can also be used to function as a target sensing system 60 by seeking detectable characteristics such as corners, colored dots or points on the product 10 as a substitute for the registration targets 40.

Aiming the precision angular aiming system 50 (steering a beam of laser light or the image field of a camera) at registration targets 40 can be a preset function when the product 10 is in a well defined location relative to the process monitor system. Alternately, if the relative location of the process monitor system to the product 10 is not known, some form of teaching (manual steering of the precision angular aiming system 50 with a joystick, mouse or remote control) can be employed. Another alternative is to search the entire field with the precision angular aiming system and the target sensing system 60.

The number of registration targets 40 used affects degrees of freedom for orientation of the process monitor system to the product. If two targets are used the process monitor system cannot compensate for more than 3 degrees of freedom. Three targets can define all six degrees of freedom (shown with arrows on the Y axis in FIGS. 4A and 4B) but cannot detect inversion. Four targets can determine six degrees of freedom as well as inversion. Using more targets allows statistical processing which improves accuracy by generating many cases defining the relative location between the process monitor system and the product. Selecting the cases which are most in agreement and discarding the others yields a "best fit" definition of the relationship between the process monitor system and the product.

Three points with XYZ definitions (registration targets 40) can be used to define a plane and an axis. This plane and axis can yield the same view from above and below in many cases. The validity of an axis can be confirmed by using three points to define an axis and then checking to see if a fourth point is accurately located where predicted by the axis (defined by the first three points).

Using six registration targets 40 yields 15 cases of axes defined by triangles with verification by a fourth point. Any three points can define a plane and an axis. With an axis defined, the location of a fourth should be able to be accurately predicted. If the accuracy of positioning of the registration targets 40 on the product 10 varies, cases not meeting precision requirements as determined by the calculation of the location of the "fourth point relative to the triangle" can be discarded.

By determining the angles from the process monitor system (mirrors 52 and 54 aimed by angles set on scanners 51A and 53) to the registration targets 40 associated with the product 10 the computer 30 can generate a set of numbers commonly known as a rotation and translation transform. This conventional transform allows CAD data to be "transformed" from one coordinate system into another coordinate system. The transform describes the rotation and translation of the as defined in the CAD coordinates of product 10, into the projector coordinates. The transform enables the system to accurately point at an object no matter how the object is placed in the system's field of view.

Figure 4A:
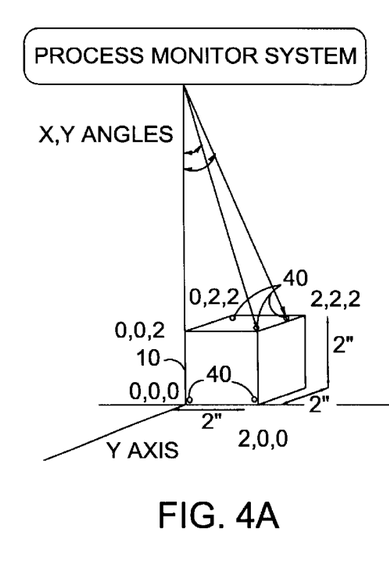
FIGS. 4A and 4B further illustrates the method of block detection with the process monitoring system of this invention.
Figure 4B:
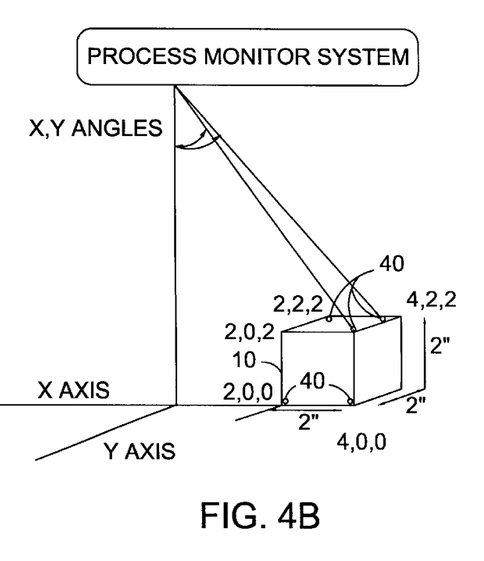

To illustrate the ability of a transform to commonly define a product in two different coordinate systems we will use our 2" cube example as shown in 4A and 4B. FIGS. 4A and 4B show the 2" cube as defined by CAD. The process monitor system must function in a coordinate system common to the product being monitored.

The same 2" cube can be moved to a different location while retaining its characteristics. The rotation and translation transform provides the definition which relates a common set of characteristics to different coordinate systems.

Figure 5:
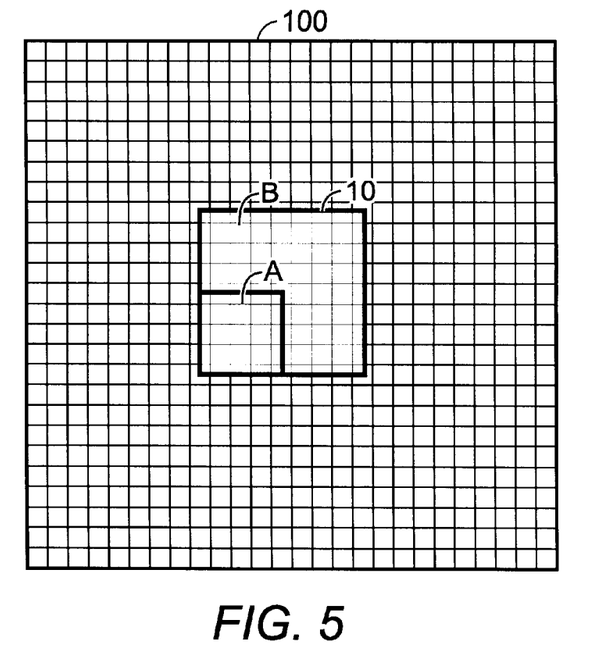
FIGS. 5-8 represent images mapped on the camera's pixels with the process monitoring system of this invention.

Referring to FIG. 5, the computer 30 applies the transform generated above to the CAD data defining the process occurring on the product (in this example, the placement of a 1" cube A on the top left front corner of a 2" cube B). The transformed CAD data can then be mapped onto the pixels of camera 70. The 3D surface will have a unique and definable 2D pattern when projected onto the camera's pixels. The camera 70 and computer 30 are not performing a 3D measurement. The camera 70 and computer 30 are determining whether process characteristics on a 3D product 10 are detected within the range of acceptable images 101 calculated for a 2D view of the product 100 from the vantage point of the process monitoring system 5. If the product 10 is processed correctly, the process characteristic defined by the 3D CAD data will be detected within the range of acceptable images 101. If the product is not processed correctly the process monitoring system 5 of this invention will not find an acceptable pattern within the range of acceptable images 101.

The camera's image is an array of pixels, typically a grid of a few hundred by a few hundred. In the cube placement example shown in FIG. 5 the anticipated view of the cubes are shown looking down along the Z axis of a properly located cube A placed upon the front left corner of cube B locate at 0,0,0. The grid pattern is a coarse representation of video pixels.

Figure 6:
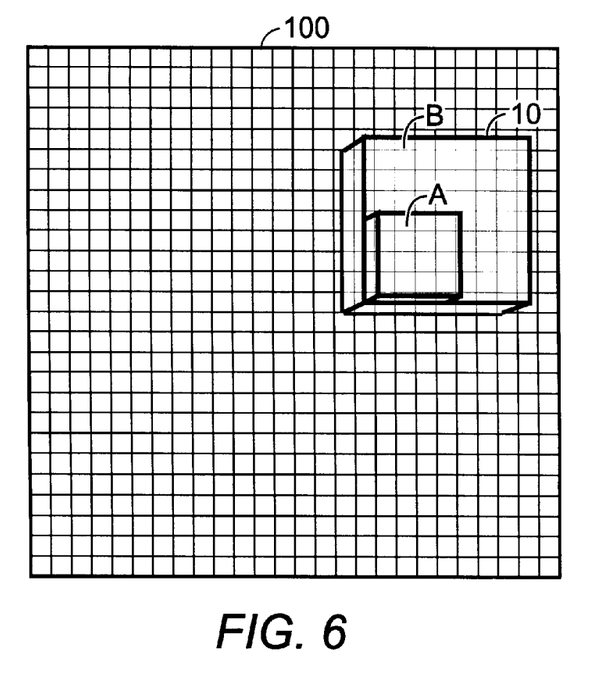

Thus, looking down the Z axis and knowing that the cubes had been moved +2" along the X axis it would be expected that the camera's pixels would show the captured image 100 as shown in FIG. 6.

Since the above-identified rotation and translation transform precisely defines the dimensional relationship between the viewpoint of the process monitor system 5 and the product 10, the dimension of each pixel as it relates to the accurate image of the product 10 as defined in CAD can be precisely defined. Defining the dimension of each 2D pixel of camera 70 in the 3D space of a correctly manufactured product allows a pixel by pixel tolerance band of acceptable images 101 to be mapped onto the camera's field.

In the cube placement example, if the tolerance were +−0.1" the process monitoring system computer 30 would calculate which pixels on the camera's field will contain each visible process characteristic (edge) if the process characteristic (edge) were located within a tolerance of +−0.1"

Figure 7:
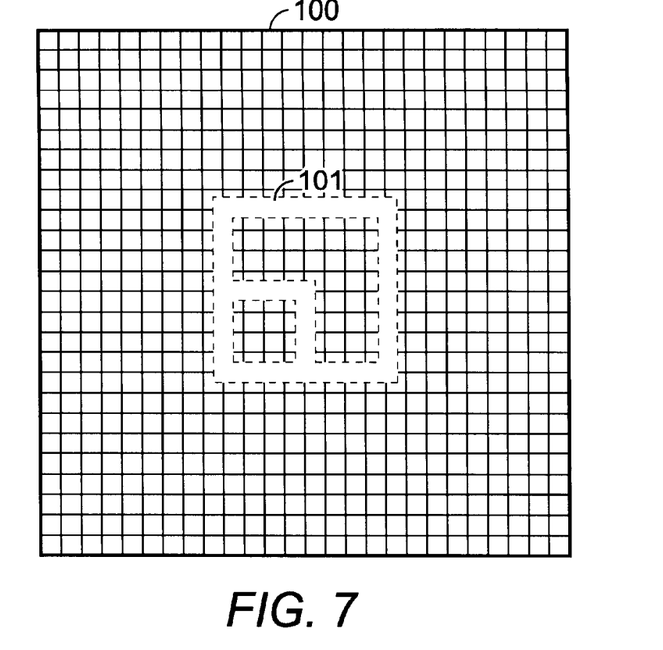

This tolerance band is the region of interest for the processing of the image. Any image processing technique which can operate in a defined region of interest can be used with the present invention to show the acceptable images 101 as shown in FIG. 7.

FIG. 8 shows a captured image 100 illustrating the edges of a misaligned block falling outside the tolerance band of acceptable images 101 which has been mapped onto the pixels of camera 70.

As shown in FIGS. 7–11, the camera 70 is aimed at the product 10 (any viewable characteristic on the product) by the precision angular aiming system 50. The resolution of the precision angular aiming system 50 is over one hundred times greater than the resolution of camera 70. High quality scanners 51 and 53 can accurately resolve 64,000 angular steps. This allows the camera's 70 field to be small, increasing resolution in local areas while allowing large field inspection by aiming the camera 70 at any segment in the field of the precision angular aiming system 50. A large field inspection is accomplished in "tiles" or segments, each with a precision greater than a single camera could accomplish with one image. FIG. 9A shows a high resolution image of a small segment (tile) for the product 10 shown in FIG. 9B. The present invention uses camera 70 to capture a small, local area and exclusively process the pixels in the tolerance band of the acceptance images 101.

Figure 10:
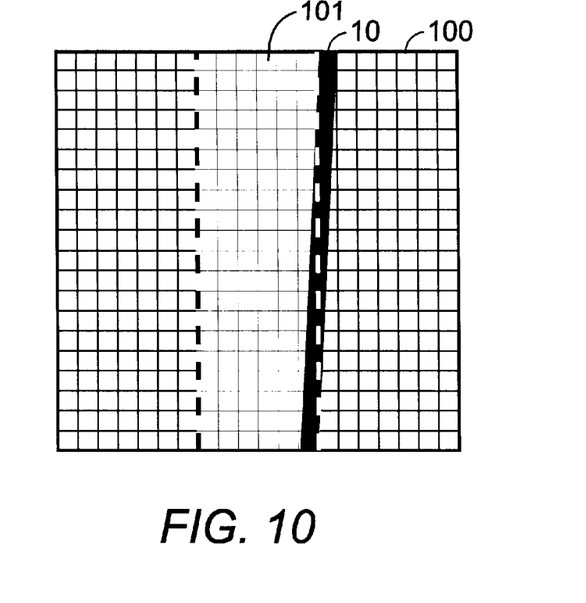

Sub-pixel level detection is easily accomplished with the precision angular aiming system 50 of this invention. Since the resolution of the precision angular aiming system 50 is 100 times greater than the camera's (precision angular aiming system 50 resolution >64,000 steps, video camera resolution generally about 600 pixels in the long axis) the precision angular aiming system 50 can precisely reorient the camera by small increments to determine where a characteristic is detected by a different pixel. FIG. 10 shows camera 70 aimed further to the left detecting a process characteristc such as an edge, for example, crossing one side of the tolerance band of acceptable images 101.

For example, consider a case where each pixel of camera 70 were 0.1" across and the precision angular aiming system 50 moves in increments of 0.001". By repeatedly capturing images 100 with the camera 70 each displaced by an additional 0.001", it is possible to detect the edge 101 to a resolution of 0.001" when the captured edge 100 was detected in the next 0.1" pixel.

Figure 11:
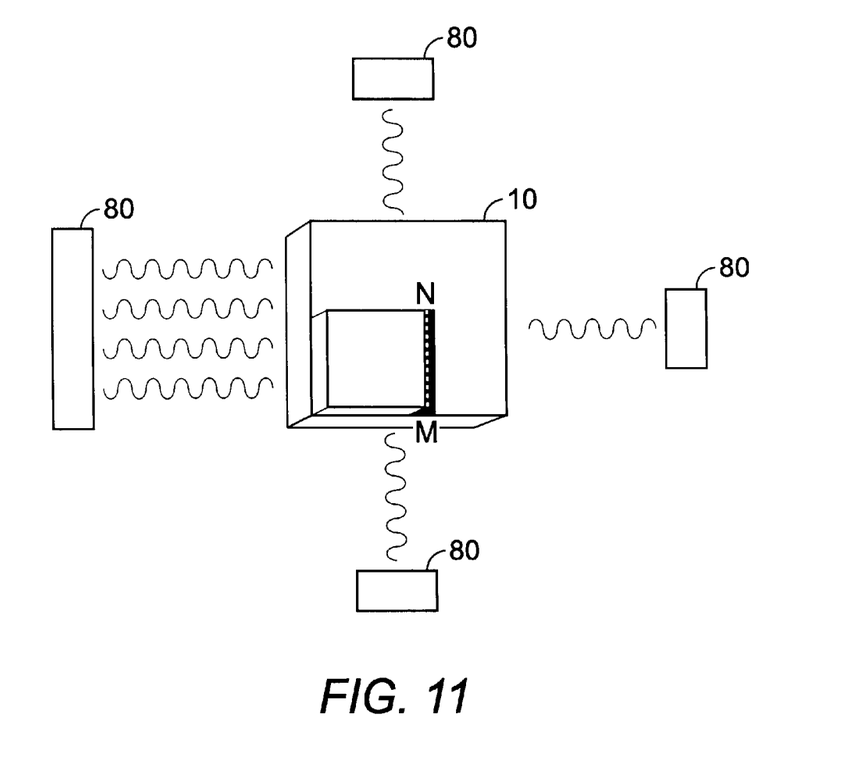
FIG. 11 represents schematically illumination shadowing utilizing the process monitoring system of this invention.

Reference is now made to FIG. 11 to describe detection enhancement with the process monitoring system of this invention. More specifically, the transform enables definition of CAD defined characteristics in the coordinate system of the process monitor system. This information can be used to provide detection enhancement 80. In the cube placement example, if the precision angular aiming system 50, camera 70 and computer 30 are attempting to detect the presence of an edge (M, N), the detectability of edge M, N can be enhanced by increasing illumination from the left and decreasing illumination from all other sources. This varied illumination enhances the shadow and contrast or bright scattering of light along edge M, N. The transform referred to above automatically accounts for variations in product orientation in the field of the process monitor system and detection enhancers.

Figure 12:
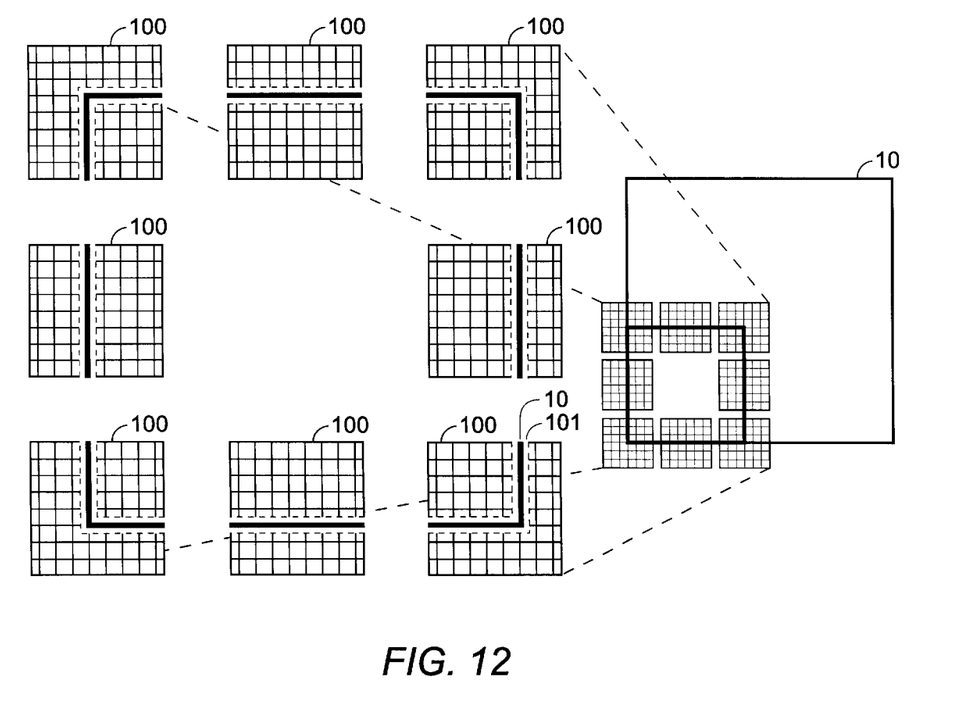
FIGS. 12 and 13 illustrate captured images showing characteristics within and outside of tolerance bands utilizing the process monitoring system of this invention.
Figure 13:
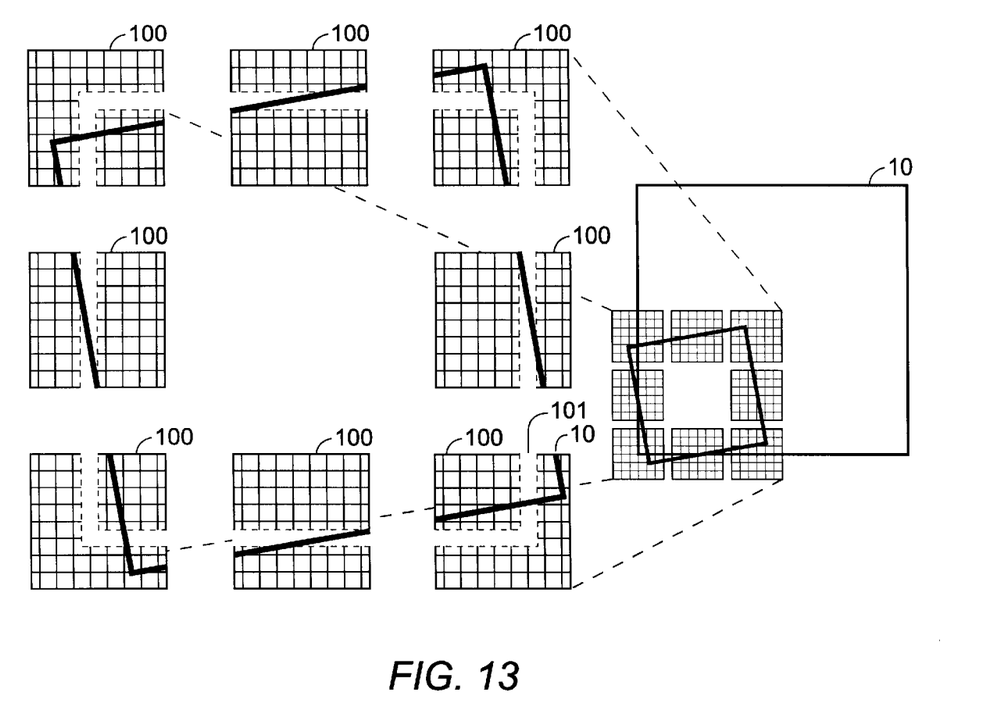

The next step, as shown in FIGS. 12 and 13, of the present invention determines whether the process characteristic as defined by 3D CAD data is present in the captured image 100 within the calculated range of acceptable images 101 to ascertain whether or not the process has occurred within tolerance.

More specifically, the presence of CAD defined characteristics in the region of interest mapped onto the pixels of camera 70 indicate acceptable processing. The calibration resulting from applying transform data to the precision angular aiming system 50 and the field of camera 70 yields quantifiable tolerance data on processing.

Although the invention has been described with respect to various embodiments, it should be realized this invention is also capable of a wide variety of further and other embodiments within the spirit and scope of the appended claims.

What is claimed is:

1. A method for monitoring a process, comprising the steps of:
    determining a location of a product in three dimensional space with respect to a process monitoring system;
    generating a rotation and translation transform which enables said process monitoring system to define the location of said product placed in a field of view of said process monitoring system;
    applying said transform to three dimensional CAD data defining the process being performed with respect to said product to provide transformed CAD data representative of three dimensional information in a single two dimensional pattern of said process with respect to said process monitoring system; and
    determining whether said single two dimensional pattern of the process is present within a range of acceptable two dimensional images of the process performed with respect to said product;
    wherein if the product is processed properly said two dimensional pattern of said process is present within said range of acceptable two dimensional images.

2. The method for monitoring a process as defined in claim 1 further comprising the steps of:
    utilizing angular data to aim a sensing component of said process monitoring system upon at least three preselected locations on said product;
    detecting said preselected locations on said product; and
    determining angular relationships of said preselected locations on said product with respect to said process monitoring system.

3. The method for monitoring a process as defined in claim 2 wherein said step of generating said rotation and translation transform is based upon said angular relationships of said preselected locations on said product with respect to said process monitoring system.

4. The method for monitoring a process as defined in claim 1 further comprising the step of mapping said two dimensional pattern of said process onto pixels of a camera of an image captured by said camera.

5. The method for monitoring a process as defined in claim 4 further comprising the step aiming said camera at said product being processed.

6. The method for monitoring a process as defined in claim 5 further comprising the step providing subpixel detection of an image captured by said camera of said product being processed.

7. The method for monitoring a process as defined in claim 1 wherein said determining step is performed by a computer.

8. The method for monitoring a process as defined in claim 1 further comprising the step of providing detection enhancement of said product being processed.

9. The method for monitoring a process as defined in claim 1 further comprising the step of quantifying results obtained from said determining step.

10. The method for monitoring a process as defined in claim 1 further comprising the step of providing reference targets at said preselected locations.

11. A method for monitoring a process, comprising the steps of:
    locating a three dimensional product with respect to a process monitoring system;
    aiming an image capturing component of said process monitoring system at a location on said three dimensional product where the process is to occur;
    determining a range of acceptable two dimensional images for correctly performing the process on said three dimensional product;
    obtaining a single two dimensional image of a location on said three dimensional product where the process is being performed; and
    determining whether said single two dimensional image of said location on said three dimensional product where the process is being performed is present within said range of acceptable two dimensional images.

12. The method for monitoring a process as defined in claim 11 further comprising the step of quantifying said determining in the form of process results.

13. The method for monitoring a process as defined in claim 11 further comprising the step of providing detection enhancement of said three dimensional product where said process is being performed.

14. A process monitoring system for monitoring a process being performed on a product, comprising:
    a sensing component which includes means for providing a beam of optical energy capable of being directed toward the product and a detector means for receiving said beam of optical energy from said product and the process being performed on the product, said sensing component generating data and signals representative of the product and the process being performed thereon;
    an angular aiming component operably connected to said sensing component for optically aiming said beam of optical energy of said sensing component;
    said data and signals providing transformed CAD data representative of three dimensional information in a single two dimensional pattern; and
    computing means operably connected between said sensing component and said angular aiming component for processing said data and signals and sending information to said angular aiming component and based thereon for providing information with respect to the process being performed on the product, said information establishing whether said single two dimensional pattern of the process is present within a range of acceptable two dimensional images of the process performed with respect to said product.

15. The process monitoring system as defined in claim 14 wherein said sensing component further comprises a camera.

16. The process monitoring system as defined in claim 14 further comprising registration targets for placement at preselected locations on said product for use in conjunction with said sensing component.

17. The process monitoring system as defined in claim 16 wherein said angular aiming component comprises a pair of rotatable reflectors, each reflector being connected to respective scanners, and said scanners being operably connected to said computing means.

18. The process monitoring system as defined in claim 14 further comprising a detection enhancement system operably associated with the product in order to control illumination of the product during the monitoring process.

* * * * *